(12) United States Patent
Kikuchi et al.

(10) Patent No.: US 10,583,894 B2
(45) Date of Patent: Mar. 10, 2020

(54) MOTOR POWER TRANSMISSION DEVICE

(71) Applicant: HONDA MOTOR CO., LTD., Minato-Ku, Tokyo (JP)

(72) Inventors: Hiroyuki Kikuchi, Wako (JP); Naoki Kamimura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 257 days.

(21) Appl. No.: 15/704,829

(22) Filed: Sep. 14, 2017

(65) Prior Publication Data

US 2019/0077485 A1 Mar. 14, 2019

(51) Int. Cl.
*F16D 43/202* (2006.01)
*B62M 6/65* (2010.01)
*B62M 11/02* (2006.01)
*F16D 41/24* (2006.01)
*B62M 9/02* (2006.01)

(52) U.S. Cl.
CPC ............... *B62M 6/65* (2013.01); *B62M 9/02* (2013.01); *B62M 11/02* (2013.01); *F16D 41/24* (2013.01); *F16D 43/2024* (2013.01)

(58) Field of Classification Search
CPC .............................. F16D 43/2024; F16H 35/10
See application file for complete search history.

(56) References Cited

U.S. PATENT DOCUMENTS

| 2,583,800 | A | * | 1/1952 | Sears | ................................. | 477/9 |
| 4,528,470 | A | * | 7/1985 | Young | ..................... | F02N 15/06 310/78 |
| 6,662,882 | B2 | * | 12/2003 | Hansson | ................. | B23Q 11/04 173/176 |
| 7,293,297 | B2 | * | 11/2007 | Hayashi | ................. | A47K 13/10 4/246.1 |
| 8,075,439 | B2 | * | 12/2011 | Ta | .......................... | A47K 13/10 192/56.1 |

FOREIGN PATENT DOCUMENTS

| JP | 04191550 | A | * | 7/1992 |
| JP | 2011-031646 | A | | 2/2011 |
| JP | 2012-192766 | A | | 10/2012 |
| JP | 2017-011975 | A | | 1/2017 |
| JP | 2017196972 | A | * | 11/2017 |

OTHER PUBLICATIONS

Office Action dated Sep. 3, 2019 issued in corresponding Japanese Patent Application No. 2016-088063.

* cited by examiner

*Primary Examiner* — Sherry L Estremsky
(74) *Attorney, Agent, or Firm* — Carrier Blackman & Associates, P.C.; Joseph P. Carrier; Jeffrey T. Gedeon

(57) ABSTRACT

In a motor power transmission device (30), wherein rotational power of an electric motor (40) is input to a sun gear (51) of a planetary speed reducer (50), and then the rotation of the sun gear (51) is converted to rotation of a planetary carrier (55), and wherein the planetary carrier (55) rotatably supports planetary gears (61, 62) and converts revolving motion of the planetary gears (61, 62) into rotating motion, and the rotation of the planetary carrier (55) is then output to an output shaft (15), a torque limiter mechanism (57) is interposed between the planetary carrier (55) and the output shaft (15). Thus, even if excessive back torque is input to the output shaft, transmission of the back torque to the speed reducer is blocked to protect the speed reducer.

3 Claims, 5 Drawing Sheets

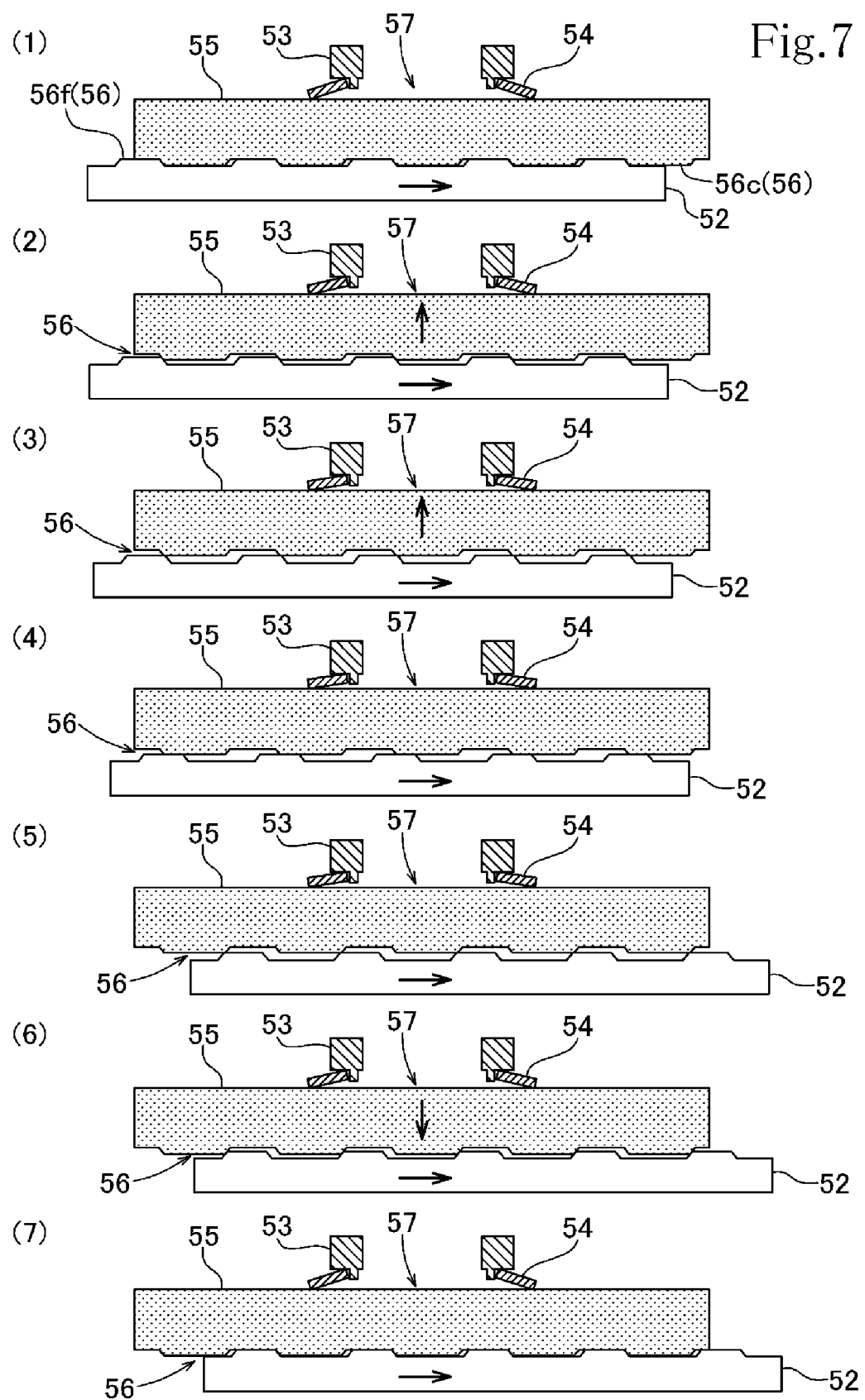

MOTOR POWER TRANSMISSION DEVICE

TECHNICAL FIELD

The present invention relates to a motor power transmission device for decelerating and transmitting power of an electric motor for a vehicle, for example.

BACKGROUND ART

A motor power transmission device transmits power of an electric motor for vehicle travel to an outside shaft after a deceleration mechanism reduces the speed. The motor power transmission device is typically provided with a torque limiter mechanism to block transmission of a torque greater than a permissible value (see, e.g., Patent Document 1).

CITATION LIST

Patent Literature

[Patent Document 1] JP 2014-121941 A

Patent Document 1 discloses a motor power transmission device in which rotation of a motor rotational shaft of an electric motor is transmitted through a speed reduction gear (cycloidal speed reducer) for speed reduction to an output member.

A torque limiter is coupled between the motor rotational shaft and an input shaft of the speed reduction gear.

During normal input of the electric motor power with a torque within a permissible value, the torque limiter is maintained in a connected state, so that the power is transmitted to the speed-reduction-gear input shaft and then the power is reduced in speed by the speed reduction gear before being transmitted to the output member. However, when excessive torque greater than a permissible value is input from the electric motor, the torque limiter blocks the power transmission to the speed reduction gear, so that the speed reduction gear is protected.

SUMMARY OF INVENTION

Underlying Problem to be Solved

The motor power transmission device disclosed in Patent Document 1 is mounted on a vehicle in order to transmit electric motor power to the vehicle wheel. Therefore, depending on travel conditions, back torque from the wheel may enter the output member of the motor power transmission device.

When the back torque is input from the wheel to the output member, the back torque is input directly to the speed reduction gear on the upstream side of the output member.

Therefore, if excessive back torque is applied to the output member, the back torque is transmitted directly to the speed reduction gear. This is not desired because of excessive load on the speed reduction gear.

The present invention has been made in view of such circumstances, and an object of the present invention is to provide a motor power transmission device capable of blocking transmission of excessive back torque to a speed reducer for protection of the speed reducer even if the excessive back torque is input to the output side.

Solution to Problem

To achieve this object, the present invention provides a motor power transmission device comprising: a planetary speed reducer including: a sun gear, an annular internal gear positioned around an outer periphery of the sun gear coaxially with the sun gear, planetary gears meshing with both the sun gear and the annular internal gear, to revolve around the sun gear while rotating about rotating axes of the planetary gears, and a planetary carrier rotatably supporting the planetary gears to convert revolving motion of the planetary gears to rotating motion of the planetary carrier; wherein the sun gear receives power of an electric motor and the rotating motion of the planetary carrier is output to an output shaft; and wherein the motor power transmission device includes a torque limiter mechanism interposed between the planetary carrier and the output shaft.

With the above configuration, because the torque limiter mechanism is interposed between the planetary carrier and the output shaft, if excessive back torque greater than a permissible value is input to the output shaft, the torque limiter mechanism works so that the back torque is blocked from being transferred to the planetary speed reducer. Thus, it is possible to avoid applying excessive load to the planetary speed reducer so that the planetary speed reducer is protected.

According to a preferred embodiment of the present invention, the torque limiter mechanism includes a flange provided integrally with the output shaft, the planetary carrier has an opposed portion facing the flange in an axial direction, a disengageable torque cam is formed between the flange and the opposed portion of the planetary carrier, and an urging member is provided to urge the planetary carrier to be pressed against the flange.

With the above configuration, the disengageable torque cam is formed between the flange and the opposed portion of the planetary carrier. The flange is provided integrally with the output shaft. The opposed portion faces the flange in the axial direction of the planetary carrier. Further, the planetary carrier is pressed against the flange by the urging member. The torque limiter mechanism is configured as above and the torque limiter mechanism is a simple mechanism in which, when excessive back torque greater than a permissible value is input to the output shaft, the engagement of the torque cam is released to block the transmission of back torque. Accordingly, the torque limiter mechanism can be incorporated in the motor power transmission device in a compact manner, and thus increase in size of the motor power transmission device can be minimized.

According to a preferred embodiment of the present invention, the flange is placed between the sun gear and the planetary carrier in the axial direction.

With the above configuration, because the flange is arranged between the sun gear and the planetary carrier in the axial direction, the flange and the torque cam are located within the planetary speed reducer. This makes it possible to reduce the axial width of the motor power transmission device.

According to another preferred embodiment of the present invention, the flange is formed at an end of a cylindrical portion of a flange member and has an enlarged outer diameter, the flange member being a member separate from the output shaft with the cylinder portion thereof fitted on the output shaft, and the planetary carrier is supported on the cylindrical portion of the flange member in a rotatable manner.

With the above configuration, the flange member is provided independently of the output shaft, and the flange member includes the cylindrical portion and the flange. The flange is formed with an increased diameter at an end of the cylindrical portion. The flange member is mounted by fitting the cylindrical portion to the output shaft. Since the planetary carrier is supported on the cylindrical portion of the flange member in a rotatable manner. Therefore, the planetary carrier is axially supported on the cylinder portion of the flange member, the cylindrical portion having an increased diameter relative to the output shaft. As a result, inclining displacement of the shaft center of the planetary carrier is prevented, and the planetary speed reducer and the torque limiter mechanism can be regularly and smoothly operated.

Advantageous Effects of Invention

According to the present invention, the motor power transmission device includes the planetary speed reducer. The power of the electric motor is input to the sun gear of the planetary speed reducer, and then the rotation of the planetary carrier of the planetary speed reducer is output to the output shaft. In such a motor power transmission device, the torque limiter mechanism is interposed between the planetary carrier and the output shaft. Therefore, if excessive back torque greater than a permissible value is input to the output shaft, the torque limiter mechanism operates so that the back torque is blocked from being transmitted to the planetary speed reducer. Thus, application of excessive load to the planetary speed reducer can be avoided to protect the same.

BRIEF DESCRIPTION OF DRAWINGS

FIG. 7 is an illustration schematically showing operational process of the torque limiter mechanism in sequence.

DESCRIPTION OF EMBODIMENT

An embodiment in accordance with the present invention will now be described with reference to the drawings.

Figure 1:
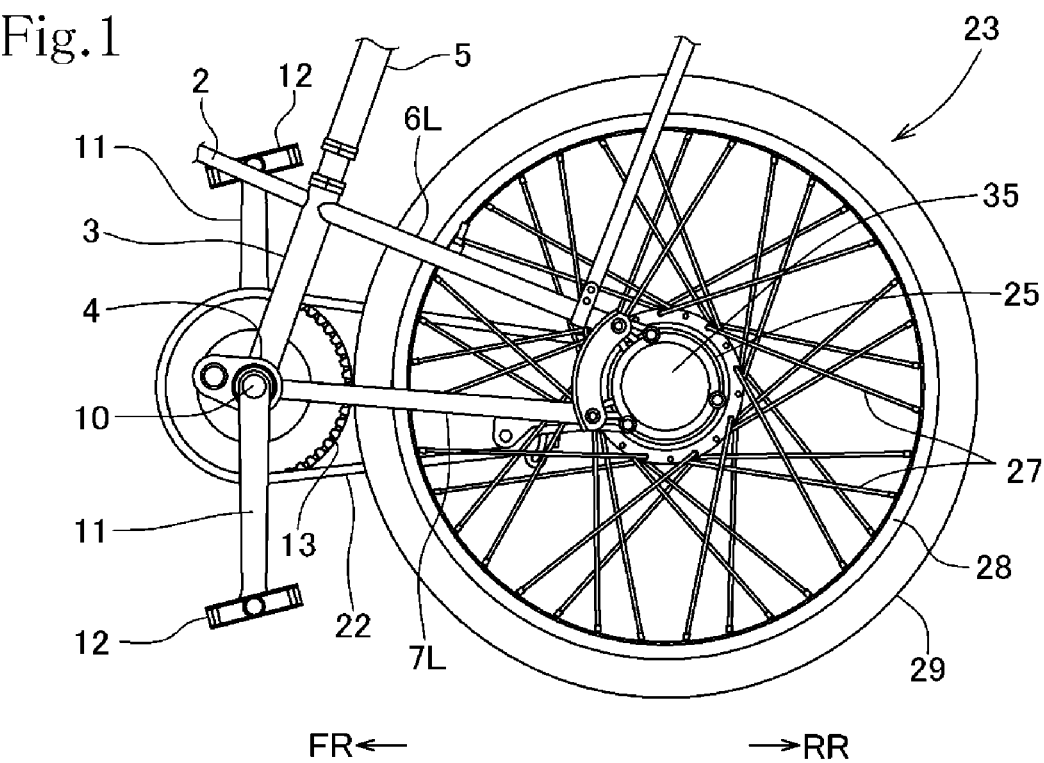
FIG. 1 is a left side view of a portion of a power-assisted pedal vehicle which includes a motor power transmission device in accordance with an embodiment of the present invention.
Figure 2:
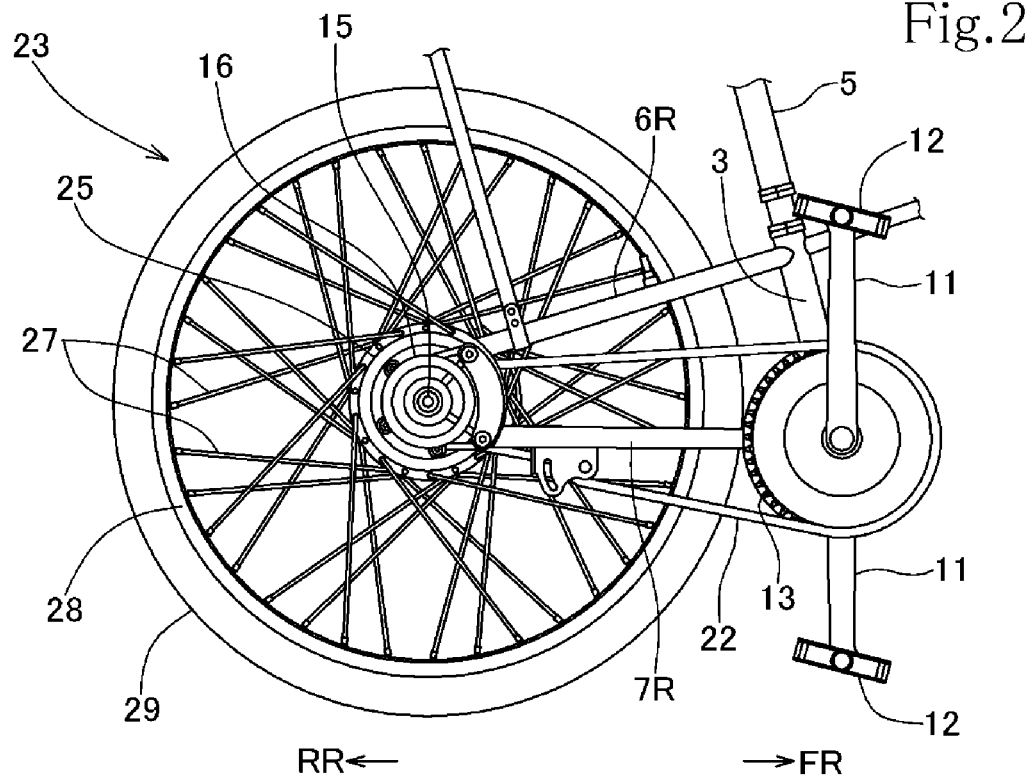
FIG. 2 is a right side view of the same portion.

FIG. 1 is a left side view of a portion of a power-assisted pedal vehicle 1 to which an embodiment of the motor power transmission device is applied, and FIG. 2 is a right side view of the same portion.

Note that forward, rearward, leftward and rightward directions set forth herein comply with normal standards in which the straight ahead direction of the power-assisted pedal vehicle 1 with the motor power transmission device mounted thereon is the forward direction, and, in the drawings, FR indicates the front direction, RR the rear direction, LH the left direction and RH the right direction.

The power-assisted pedal vehicle 1 is a vehicle in which an electric motor is used as auxiliary power in a bicycle capable of traveling by man power pedaling, but the power-assisted pedal vehicle 1 is also capable of using only the power of the electric motor for its travel.

As illustrated in FIGS. 1 and 2, a main frame 2 extends obliquely rearward from a front head pipe, not-shown, and a rear end of the main frame 2 extends rearward in inclined attitude to be coupled to a center frame 3. The center frame 3 extends vertically in a rearwardly inclined attitude.

A seat post 5 extends upward from the center frame 3, and a seat, not shown, is supported on the upper end of the seat post 5. Bearings 4 are provided at the lower end of the center frame 3, and the bearings 4 supports a pedal shaft 10 rotatably.

Proximal ends of pedal arms 11 are fitted on the two ends of the pedal shaft 10, and pedals 12 are attached to the distal ends of the pedal arms 11, respectively.

Further, a drive sprocket 13 is fitted on the pedal shaft 10.

A pair of left and right rear frames 6L and 6R extends rearward from the upper end portion of the center frame 3, and another pair of left and right rear frames 7L and 7R also extends rearward from the portions of the bearings 4 at the lower end of the center frame 3.

The upper and lower left rear frames 6L and 7L are coupled at their rear ends to left support members (a motor transmission case 33 and a motor cover 35 to be described later), the left support members rotatably supporting a rear axle 15 (see FIG. 3). The upper and lower right rear frames 6R and 7R are coupled at their rear ends to a right bearing member 16 which rotatably supports the rear axle 15 (see FIG. 2).

Figure 3:
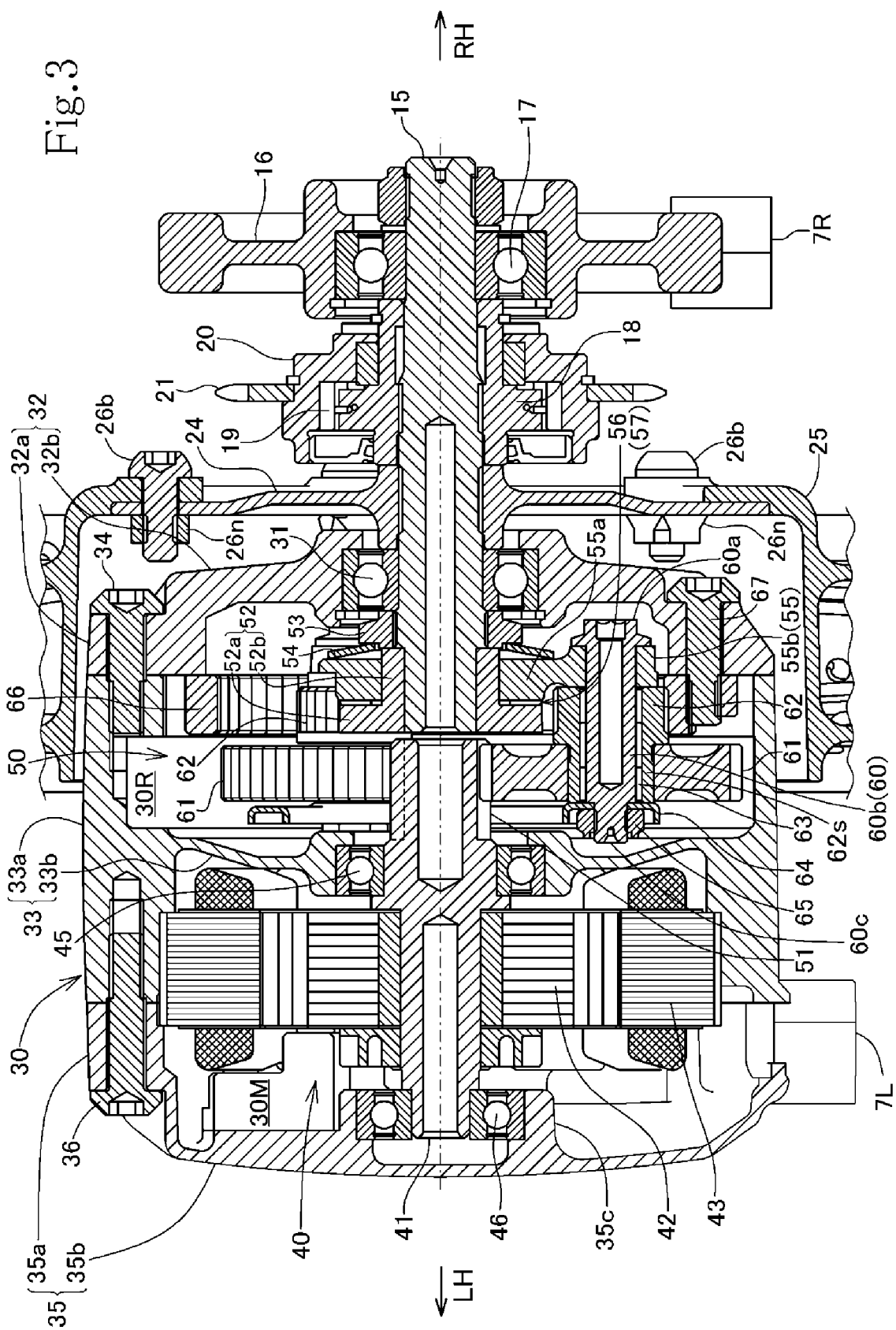
FIG. 3 is a sectional view of the motor power transmission device and so on, taken along III-III line in FIG. 4.

Referring to FIG. 3, the right end of the rear axle 15 is journaled through a bearing 17 by the right bearing member 16. The bearing 17 is adjacent to a support sleeve 18, and the support sleeve 18 is spline-fitted on the rear axle 15.

The support sleeve 18 rotates integrally with the rear axle 15, and a sprocket holder 20 is fitted through a one-way clutch 19 over the outer periphery of the support sleeve 18. A driven sprocket 21 is fitted on the sprocket holder 20.

A drive chain 22 is passed around the drive sprocket 13 and the driven sprocket 21. The drive sprocket 13 is fitted to the pedal shaft 10 and the driven sprocket 21 is fitted on the rear axle 15.

The support sleeve 18 is adjacent to a disc-shaped hub plate 24, and the hub plate 24 is spline-fitted on, and supported by the rear axle 15. A cylindrical hub case 25 is attached by being coupled to the outer periphery of the hub plate 24 with bolts 26b and nuts 26n.

The hub plate 24 and the hub case 25 are thus coupled in one piece, and the hub plate 24 and the hub case 25 form a bottomed cylindrical shape with the hub plate 24 serving as a bottom wall and the hub case 25 serving as a cylindrical portion. The bottomed cylindrical shape has a left-side opening end and the bottomed cylindrical shape is supported integrally with the rear axle 15.

A rear wheel 23 is configured such that spokes 27 are interposed between the outer periphery of the hub case 25 and a rim 28, and the rim 28 holds a rear wheel tire 29 from inside (see FIGS. 1 and 2).

Referring to FIG. 3, the rear axle 15 extends through the hub plate 24 into the hub case 25, and a motor power transmission device 30 is arranged on and around the rear axle 15. The motor power transmission device 30 is partially covered with the hub plate 24.

The motor power transmission device 30 includes an electric motor 40 and a planetary speed reducer 50. The planetary speed reducer 50 decelerates and outputs the power of the electric motor 40.

A right speed reducer cover 32 is located adjacent to the hub plate 24, and the speed reducer cover 32 is rotatably supported through a bearing 31 at an axial position of the rear axle 15, extending out of the hub plate 24.

The speed reducer cover 32 is formed in a bottomed cylindrical shape made up of an axially narrow cylindrical portion 32a and a bottom wall 32b. A central boss on the bottom wall 32b is fitted on an outer race of the bearing 31.

A right end face of a cylindrical portion 33a of a motor transmission case 33 abuts on the left end face of the cylindrical portion 32a of the speed reducer cover 32, and the motor transmission case 33 is coupled to the left end face of the cylindrical portion 32a by being fastened with bolts 34.

The motor transmission case 33 has a bearing wall 33b formed at an axially central position of the cylinder portion 33a, and the motor transmission case 33 has cavities on both axial sides of the bearing wall 33b.

The motor cover 35 is placed to cover the left opening of the motor transmission case 33.

The motor cover 35 is formed in a bottomed cylindrical shape made up of a cylindrical portion 35a and a bottom wall 35b. The right end face of the cylinder portion 35a abuts on the left end face of the motor transmission case 33, and the motor cover 35 is coupled to the motor transmission case 33 by being fastened with bolts 36.

The motor cover 35 and the motor transmission case 33 are coupled to, and supported by the rear ends of the upper and lower left rear frames 6L and 7L.

The inner space created between the motor cover 35 and the bearing wall 33b of the motor transmission case 33 constitutes a motor space 30M. The electric motor 40 is mounted in the motor space 30M.

An inner space created between the speed reducer cover 32 and the bearing wall 33b of the motor transmission case 33 constitutes a speed reducer space 30R, and the planetary speed reducer 50 is installed in the speed reducer space 30R.

The electric motor 40 has a motor rotational shaft 41 provided coaxially with the rear axle 15 in a position adjacent to the left end face of the rear axle 15.

Specifically, the motor rotational shaft 41 is journaled through a bearing 45 in the bearing wall 33b of the motor transmission case 33, and the left end of the motor rotational shaft 41 is also journaled on a bearing 46. The bearing 46 is fixed in a cylindrical bearing portion 35c. The cylindrical bearing portion 35c protrudes axially from the center of the bottom wall 35b of the motor cover 35. The motor rotational shaft 41 is rotatably supported by the motor transmission case 33 and the motor cover 35.

A motor rotor 42 is fitted between the left and right bearings 46 and 45 supporting the motor rotational shaft 41, in such a manner that the motor rotational shaft 41 rotates integrally with the motor rotor 42.

A motor stator 43 is placed around the outer periphery of the motor rotor 42, and the motor stator 43 is supported by the motor transmission case 33.

The motor rotational shaft 41 has a journal portion supported by the right bearing 45, and the motor rotational shaft 41 protrudes rightward from the journal portion through the bearing wall 33b to extend into the speed reducer space 30R. On the protruding right end portion of the motor rotational shaft 41, a sun gear 51 of the planetary speed reducer 50 is formed.

On the other hand, the left end of the rear axle 15 is located in close proximity to the sun gear 51 on the right end portion of the motor rotational shaft 41, and a separate flange member 52 is fitted over the left end of the rear axle 15.

The flange member 52 includes a cylindrical portion 52b and a flange 52a. The cylindrical portion 52b is fitted over the rear axle 15. The flange 52a of an increased diameter is formed at the left end of the cylindrical portion 52b.

Between the cylindrical portion 52b of the flange member 52 and the inner race of the bearing 31, an annular retainer member 53 is placed, and the retainer member 53 is fitted over the rear axle 15. The flange member 52 is positioned such that the left end face of the flange 52a is located approximately flush with the left end face of the rear axle 15.

A planetary carrier 55 is supported in an axially slidable manner on the cylindrical portion 52b of the flange member 52.

Figure 4:
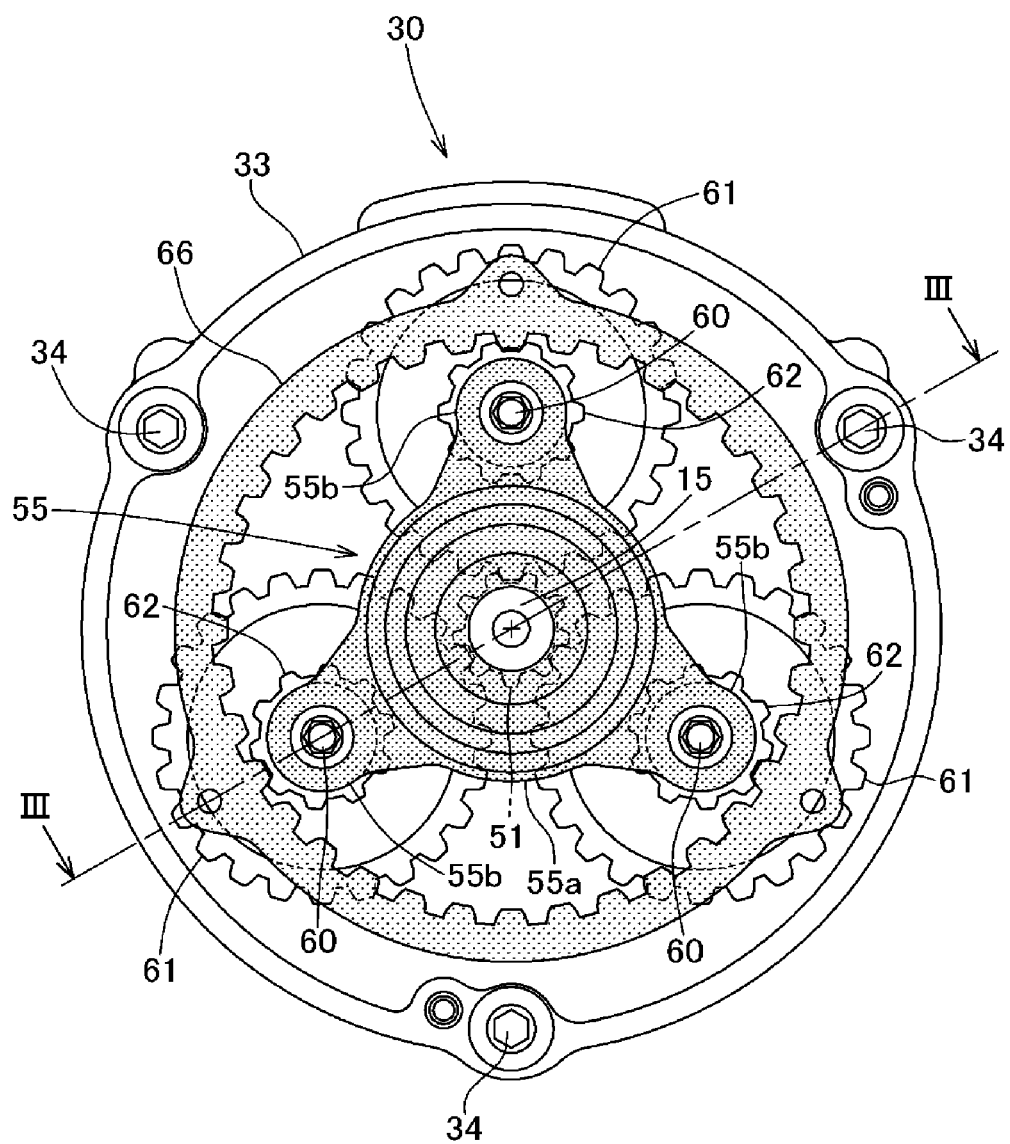
FIG. 4 is a right side view of the motor power transmission device with a speed reducer cover removed.
Figure 5:
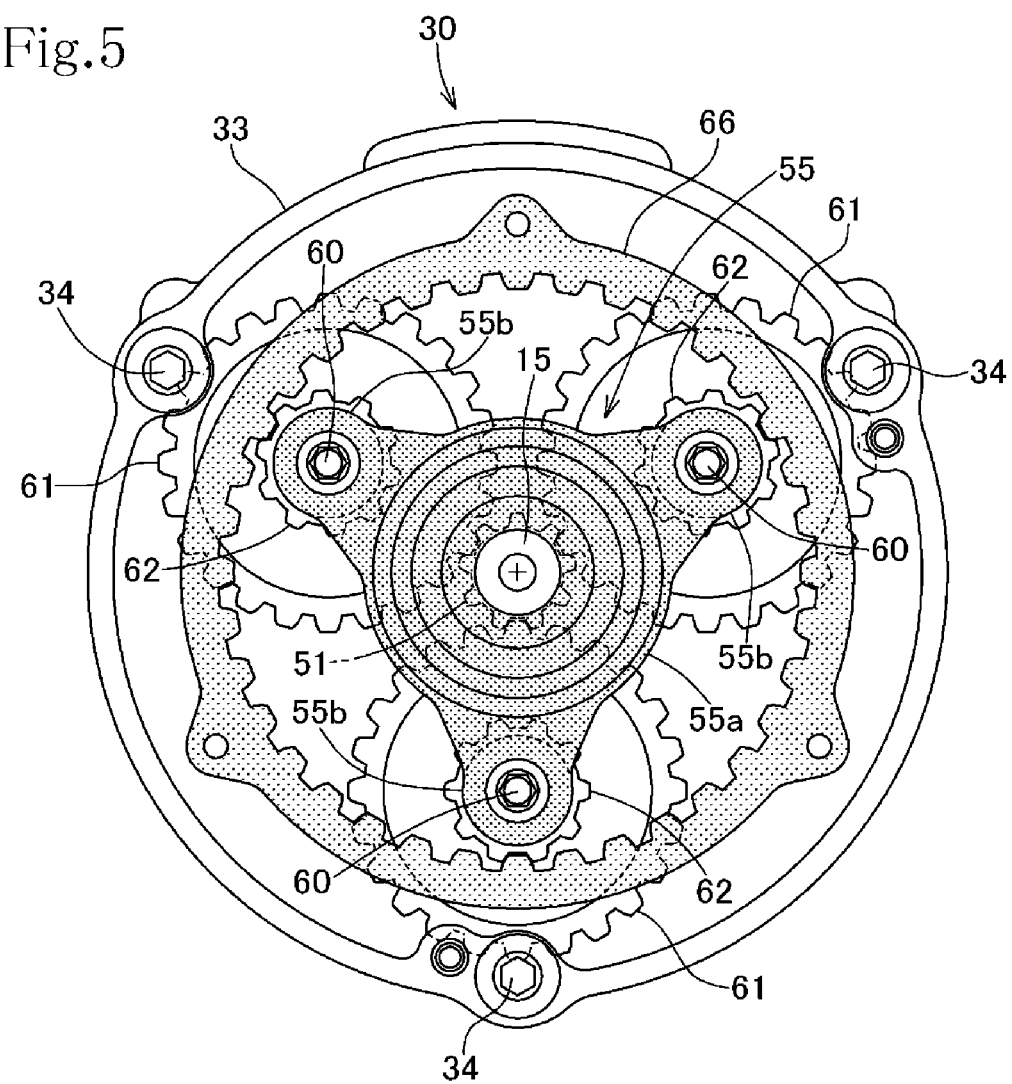
FIG. 5 is a right side view of the motor power transmission device, showing a different rotational position of a planetary carrier.

As shown by dotted pattern in FIGS. 4 and 5, the planetary carrier 55 has a disc portion 55a from which three arms 55b extend radially at regular intervals apart from each other.

The planetary carrier 55 is supported on the outer periphery of the cylindrical portion 52b of the flange member 52 in an axially slidable manner. A disc spring 54 is interposed between the disc portion 55a of the planetary carrier 55 and the retainer member 53. The planetary carrier 55 is urged leftward by the disc spring 54.

Figure 6:
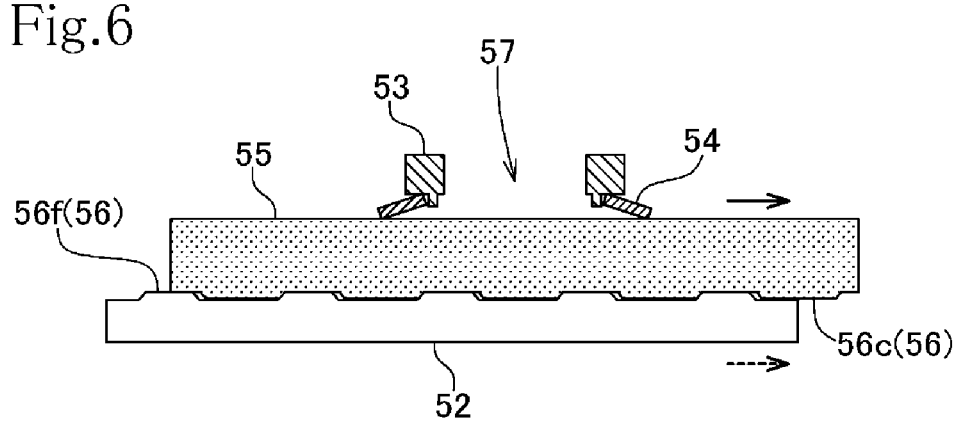
FIG. 6 is a schematic view of a torque limiter mechanism with the planetary carrier and a flange member being developed.

The left end face of the disc portion 55a of the planetary carrier 55 faces the right end face of the flange 52a of the flange member 52, and as shown in FIG. 6, uneven surfaces 56c and 56f are provided on the mutually opposing surfaces of the disc portion 55a and the flange 52a. On each of the uneven surfaces 56c and 56f, a plurality of trapezoid-shaped cam noses (trapezoidal protrusions) are formed to extend transversely to the circumferential directions in such a fashion that the trapezoid-shaped cam noses are spaced at predetermined intervals in the circumferential directions. A torque cam 56 is thus formed by the uneven surfaces 56c and 56f capable of being engaged with each other between the flange member 52 and the planetary carrier 55. The planetary carrier 55 is urged axially by the disc spring 54.

In other words, the torque cam 56 transmits power between the flange member 52 and the planetary carrier 55 while absorbing relative torque variation by axial movement of the planetary carrier 55 axially urged by the disc spring 54.

When an excessive relative torque greater than a permissible value is applied, the planetary carrier 55 axially urged by the disc spring 54 is moved against the urging force of the disc spring 54, whereby the torque cam 56 releases mutual engagement between the uneven surfaces 56c and 56f to block the transmission of power. Thus a torque limiter mechanism 57 is provided.

Through each of the distal ends of the three arms 55b of the planetary carrier 55, a support shaft 60 passes from right to left. Each of the support shafts 60 rotatably supports thereon a first planetary gear 61 of a larger diameter and a second planetary gear 62 of a smaller diameter in integrally rotatable manner.

The first planetary gear 61 of the larger diameter is located at the same axial position as that of the sun gear 51, which is located on the right portion of the motor rotational shaft 41. Therefore the first planetary gear 61 meshes with the sun gear 51.

The support shaft 60 has a cylindrical shaft portion 60b as a main body, and the support shaft 60 has a flanged head 60a at the right end of the cylindrical shaft portion 60b. On the support shaft 60, a male screw 60c with a reduced diameter is formed at the distal end (left end) of the cylindrical shaft portion 60b.

The support shaft 60 passes through the distal end of each of the arms 55b of the planetary carrier 55, with the flanged head 60a in abutment with the arm 55b. In this condition, the second planetary gear 62 of the smaller diameter is rotatably supported through a needle bearing 63 on the cylindrical shaft portion 60b of the support shaft 60, with the cylindrical shaft portion 60b protruding leftward from the arm 55b.

The second planetary gear 62 has a cylindrical portion 62s extending leftward, and the first planetary gear 61 of the larger diameter is fitted on the cylindrical portion 62s.

The first planetary gear 61 and the second planetary gear 62 rotates integrally.

An annular support member 64 is provided on the male screw 60c on the left end of each of the three support shafts 60, and the annular support member 64 is placed along the left side of the first planetary gear 61. The male screw 60c extends out of the annular support member 64, and a nut 65 is screwed onto the protruding male screw 60c. Thus, the planetary carrier 55 and the annular support members 64, between which the cylindrical shaft portion 60b of each of the three mutually parallel support shafts 60 are placed, are fastened integrally.

An annular internal gear (ring gear) 66 is provided to be in axial abutment with the left end surface of the narrow cylindrical portion 32a of the speed reducer cover 32, which is positioned on the right side of the planetary carrier 55 and supported by the bearing 31. The annular internal gear 66 is attached to the left end surface of the narrow cylindrical portion 32a with fixing bolts 67.

The three second planetary gears 62 mesh with the internal tooth of the annular internal gear 66.

FIGS. 4 and 5 are right side views illustrating the motor power transmission device 30 with the speed reducer cover 32 removed.

Referring to FIGS. 4 and 5, the first planetary gears 61 of the larger diameter are rotatably supported respectively by the three arms 55b of the planetary carrier 55, and each of the first planetary gears 61 meshes with the sun gear 51, while each of the second planetary gears 62 of the smaller diameter in combination with each of the first planetary gears 61 meshes with the annular internal gear 66.

The planetary speed reducer 50 is configured as described above. When the electric motor 40 is actuated to rotate the motor rotational shaft 41, the sun gear 51 is rotated. Since the three first planetary gears 61 mesh with the sun gear 51 and the three second planetary gears 62 mesh with the annular internal gear 66, and since each of the three first planetary gears 61 and the corresponding one of the three second planetary gears 62 integrally rotate together, the first and second planetary gears 61 and 62 being rotated are then caused to revolve around the sun gear 51. Consequently, the planetary carrier 55, supporting the three sets of the first and second planetary gears 61 and 62, follows the revolving motion of the first and second planetary gears 61 and 62 to rotate, so as to perform its speed reducing operation to reduce the rotational speed (see FIGS. 4 and 5).

The rotation of the planetary carrier 55 is transmitted to the flange member 52 through the engagement of the uneven surface 56c and 56f of the torque cam 56 (see FIG. 6), and thus the rotation of the rear axle 15 is assisted in combination with the rotation of the flange member 52.

In this manner, the operation of the electric motor 40 serves as a power for assisting travel by pedal, but with the use of the motor power transmission device 30, the power-assisted pedal vehicle 1 is capable of traveling only by the power of the electric motor 40.

During normal travel, the power of the electric motor 40 acts as auxiliary power as described above. When excessive back torque is applied during the normal travel from the rear wheel 23 to the motor power transmission device 30, the torque limiter mechanism 57 including the torque cam 56 actuates. The torque cam 56 is provided between the flange member 52 and the planetary carrier 55, and the flange member 52 is fitted to the left end of the rear axle 15.

The operation of the torque limiter mechanism 57 will be described with reference to FIG. 7.

FIG. 7(1) to FIG. 7(7) are illustrations schematically depicting the operational process of the torque limiter mechanism 57 in sequence when excessive back torque occurs.

The views shown in FIGS. 6 and 7 are schematic views of the torque limiter mechanism 57 with the planetary carrier 55 and the flange member 52 being shown developed. In FIG. 7, relative rotation of the planetary carrier 55 and the flange member 52 is shown, from a view point of relative rotation of the flange member 52 with the rotation of the planetary carrier 55 stopped.

Since back torque is transmitted to the rear axle 15 from the rear wheel 23, the back torque is applied first to the flange member 52. Then, as shown in FIG. 7(1), by the relative rotation of the flange member 52 as indicated with the arrow, the inclined side surfaces of the trapezoidal protrusions on the flange uneven surface 56f on the flange member 52 are caused to abut against inclined side surfaces of the trapezoidal protrusions on the carrier uneven surface 56c on the planetary carrier 55, so that mutual engagement is produced.

Thereupon, the planetary carrier 55 is axially moved against the urging force of the disc spring 54 so that the trapezoidal protrusions on the carrier uneven surface 56c are caused to slide up along the inclined side surfaces of the trapezoidal protrusions of the flange uneven surface 56f (see FIG. 7(2) and FIG. 7(3)).

After the trapezoidal protrusions of the carrier uneven surface 56c have completely slid up along the inclined side surface of the trapezoidal protrusions on the flange uneven surface 56f, as shown in FIG. 7(4), the engagement of the carrier uneven surface 56c and the flange uneven surface 56f is released, so that the transmission of the back torque from the flange member 52 to the planetary carrier 55 is blocked.

Then, the trapezoidal protrusions of the carrier uneven surface 56c climb over the trapezoidal protrusions of the flange uneven surface 56f, and the urging force of the disc spring 54 causes the trapezoidal protrusions of the carrier uneven surface 56c to be engaged again with the trapezoidal protrusions of the flange uneven surface 56f (see FIG. 7(5) and FIG. 7(6)). Then, the initial state shown in FIG. 7(1) is obtained (see FIG. 7(7)).

Accordingly, insofar as excessive back torque is input from the rear wheel 23 to the rear axle 15 to be applied to the flange member 52, the process from FIG. 7(1) to FIG. 7(7) is repeated, so that the back torque is blocked from being transmitted to the planetary carrier 55 by the torque limiter mechanism 57 due to the torque cam 56 between the flange member 52 and the planetary carrier 55.

Therefore, the torque limiter mechanism 57 blocks the transmission of excessive back torque to the planetary carrier 55 of the planetary speed reducer 50, and thus the torque limiter mechanism 57 can avoid applying excessive load to the planetary speed reducer 50, so that the planetary speed reducer 50 is protected.

An embodiment of the motor power transmission device in accordance with the present invention has been described in detail, and the embodiment produces the following advantageous effects.

Because, as illustrated in FIGS. 3 and 7, the torque limiter mechanism 57 is interposed between the planetary carrier 55 and the rear axle 15, when excessive back torque greater than a permissible value is input to the rear axle 15, the torque limiter mechanism 57 operates to block transmission of the back torque to the planetary speed reducer 50. As a result, excessive load on the planetary speed reducer 50 is prevented, and thus the planetary speed reducer 50 can be protected.

As illustrated in FIG. 3, the disengageable torque cam 56 is formed between the flange 52a and the disc portion 55a, the flange 52a being provided integrally with the rear axle 15, and the disc portion 55a being a member oppositely facing the flange 52a in the axial direction of the planetary carrier 55. Further, the planetary carrier 55 is pressed against the flange 52a by the disc spring 54, to thus constitute the torque limiter mechanism 57. Because of this, the torque limiter mechanism 57 is a simple mechanism in which, when excessive back torque greater than a permissible value is input to the rear axle 15, the engagement of the torque cam 56 is released to block the transmission of back torque. Accordingly, the torque limiter mechanism 57 can be incorporated in the motor power transmission device 30 in a compact manner, and thus increase in size of the motor power transmission device 30 can be minimized.

Because, as illustrated in FIG. 3, the flange 52a is arranged between the sun gear 51 and the planetary carrier 55 in the axial direction, the flange 52a and the torque cam 56 are located within the planetary speed reducer 50. As a result, a reduction in axial width of the motor power transmission device 30 can be achieved.

As illustrated in FIG. 3, the flange member 52 is independent of the rear axle 15, and the flange member 52 includes the cylindrical portion 52b and the flange 52a, the flange 52a of an increased diameter being formed at the axial end of the cylindrical portion 52b. The flange member 52 is mounted by fitting the cylindrical portion 52b over the rear axle 15 and the planetary carrier 55 is supported on the cylindrical portion 52b of the flange member 52 in a rotatable manner. Therefore, the planetary carrier 55 is supported by the cylindrical portion 52b of the flange member 52, the cylindrical portion 52b having an outer diameter larger than that of the rear axle 15. As a result, inclination displacement of the shaft center of the planetary carrier 55 is prevented, and the planetary speed reducer 50 and the torque limiter mechanism 57 are able to be regularly and smoothly operated.

The motor power transmission device 30 in accordance with an embodiment according to the present invention has been described, but it should be understood that aspects of the present invention are not limited to the above embodiment and various aspects embodied without departing from the scope and sprit of the present invention are included.

REFERENCE SINGS LIST

1 . . . Power-assisted pedal vehicle
2 . . . Main frame
3 . . . Center frame
4 . . . Bearing
5 . . . Seat post
6L, 6R, 7L, 7R . . . Rear frame
10 . . . Pedal shaft
11 . . . Pedal arm
12 . . . Pedal
13 . . . Drive sprocket
15 . . . Rear axle
16 . . . Bearing member
17 . . . Bearing
18 . . . Support sleeve
19 . . . One-way clutch
20 . . . Sprocket holder
21 . . . Driven sprocket
22 . . . Drive chain
23 . . . Rear wheel
24 . . . Hub plate
25 . . . Hub case
26b . . . Bolt
26n . . . Nut
27 . . . Spoke
28 . . . Rim
29 . . . Rear wheel tire
30 . . . Motor power transmission device
31 . . . Bearing
32 . . . Speed reducer cover
32a . . . Cylindrical portion
32b . . . Bottom wall
33 . . . Motor transmission case
33a . . . Cylindrical portion
33b . . . Bearing wall
34 . . . Bolt
35 . . . Motor cover
35a . . . Cylindrical portion
35b . . . Bottom wall
36 . . . Bolt
40 . . . Electric motor
41 . . . Motor rotational shaft
42 . . . Motor rotor
43 . . . Motor stator
45 . . . Bearing
46 . . . Bearing
50 . . . Planetary speed reducer
51 . . . Sun gear
52 . . . Flange member
52a . . . Flange
52b . . . Cylindrical portion
53 . . . Retainer member
54 . . . Disc spring
55 . . . Planetary carrier
55a . . . Disc portion
55b . . . Arm
56 . . . Torque cam
57 . . . Torque limiter mechanism
60 . . . Support shaft
61 . . . First planetary gear
62 . . . Second planetary gear
63 . . . Needle bearing
64 . . . Annular support member
65 . . . Nut
66 . . . Annular internal gear (ring gear)
67 . . . Mounting bolt

The invention claimed is:

1. A motor power transmission device (30) comprising:
a planetary speed reducer (50) including: a sun gear (51), an annular internal gear (66) positioned around an outer periphery of the sun gear (51) coaxially with the sun gear (51), planetary gears (61, 62) meshing with both the sun gear (51) and the annular internal gear (66), to revolve around the sun gear (51) while rotating about rotating axes of the planetary gears (61, 62), and a planetary carrier (55) rotatably supporting the planetary gears (61, 62) to convert revolving motion of the planetary gears (61, 62) to rotating motion of the planetary carrier (55);

wherein the sun gear (51) receives power of an electric motor (40) and the rotating motion of the planetary carrier (55) is output to an output shaft (15);

wherein the motor power transmission device (30) includes a torque limiter mechanism (57) interposed between the planetary carrier (55) and the output shaft (15); and wherein the torque limiter mechanism (57) includes a flange (52*a*) provided integrally with the output shaft (15), the planetary carrier (55) has an opposed portion (55*a*) facing the flange (52*a*) in an axial direction, a disengageable torque cam (56) is formed between the flange (52*a*) and the opposed portion (55*a*) of the planetary carrier (55), and an urging member (54) is provided to urge the planetary carrier (55) to be pressed against the flange (52*a*).

2. The motor power transmission device according to claim 1, wherein the flange (52*a*) is placed between the sun gear (51) and the planetary carrier (55) in the axial direction.

3. The motor power transmission device according to claim 2, wherein:

the flange (52*a*) is formed at an end of a cylindrical portion (52*b*) of a flange member (52) and has an enlarged outer diameter, the flange member (52) being a member separate from the output shaft (15) with the cylindrical portion (52*b*) thereof fitted on the output shaft (15), and the planetary carrier (55) is supported on the cyl0indrical portion (52*b*) of the flange member (52) in a rotatable manner.

* * * * *